(12) United States Patent
Hsiung et al.

(10) Patent No.: US 7,794,089 B2
(45) Date of Patent: Sep. 14, 2010

(54) LIQUID CRYSTAL PROJECTION SYSTEM

(75) Inventors: Chien-chih Hsiung, Tantz Shiang (TW);
Keng-hui Lin, Tantz Shiang (TW);
Tsi-lung Wu, Tantz Shiang (TW);
Wen-lang Hung, Tantz Shiang (TW)

(73) Assignee: Asia Optical Co., Inc., Taichung (TW)

( * ) Notice: Subject to any disclaimer, the term of this patent is extended or adjusted under 35 U.S.C. 154(b) by 441 days.

(21) Appl. No.: 12/022,948

(22) Filed: Jan. 30, 2008

(65) Prior Publication Data
US 2008/0180638 A1 Jul. 31, 2008

(30) Foreign Application Priority Data
Jan. 30, 2007 (TW) .............................. 96103332 A (51) Int. Cl.
*G03B 21/14* (2006.01)
(52) U.S. Cl. ............................ 353/20; 353/33; 359/634; 349/9
(58) Field of Classification Search .................. 353/20, 353/31, 33, 34, 37; 359/629, 634, 640; 349/5, 349/8, 9
See application file for complete search history.

(56) References Cited
U.S. PATENT DOCUMENTS
6,454,416 B2 9/2002 Aoto et al.
6,773,111 B2* 8/2004 Yamamoto .................... 353/20
6,819,497 B2 11/2004 Suzuki et al.
7,111,942 B2* 9/2006 Hirata et al. ................... 353/33

* cited by examiner

*Primary Examiner*—Kevin Pyo (57) ABSTRACT

A liquid crystal projection system includes a light source module, a light management module, an image signal module and a projection lens. The light source module provides an illumination light beam of first polarization state. The light management module includes a color separator for separating the illumination light beam into a first color light beam and a bichromatic light beam, first and second reflectors for respectively reflecting the first color light beam and the bichromatic light beam, a phase plate for converting the polarization of the bichromatic light beam, a first PBS for receiving the first color light beam, a second PBS for receiving the bichromatic light beam, and a dichroic prism for separating the bichromatic light beam into second and third color light beams. The image signal module includes three image modulation units for transforming the polarizations of the first, second and third color light beams and modulating them into image light beams carrying corresponding image signals. The projection lens projects the first, second and third color light beams carrying corresponding image signals from the second PBS to a screen.

20 Claims, 8 Drawing Sheets

LIQUID CRYSTAL PROJECTION SYSTEM

BACKGROUND OF THE INVENTION

1. Field of the Invention

The present invention relates to a projection system, and particularly relates to a liquid crystal projection system that utilizes three liquid crystal panels.

2. Description of Prior Art

In recent years, in term of the number of liquid crystal panels to be used for displaying an input image signal, liquid crystal projection systems have been developed from a single-panel type to a three-panel type. A liquid crystal projection system with three LCoS (Liquid Crystal on Silicon) panels comparatively offers high resolution, high color fidelity and high brightness images.

A conventional liquid crystal projection system with three LCoS panels is disclosed in U.S. Pat. No. 6,454,416, in which additional optical elements are provided between each of the two PBSs (Polarization Beam Splitters) and the dichroic prism thereof. These additional optical elements include a selected-wavelength phase plate for rotating the polarization of a corresponding incident primary-color light beam by 90°, and a glass plate for equalizing the optical path lengths of the light beams from the three panels. U.S. Pat. No. 6,819,497 also discloses a conventional three-panel liquid crystal projection system, in which four PBSs are employed and a color selective polarizer or a glass plate is also disposed between opposing PBSs.

It is known that, for a liquid crystal projection system employing three LCoS panels, high assembly precision is required. In order to make the images formed on the three LCoS panels to correctly overlap with each other so as to obtain a high-resolution image, each component prism must be made reliable, which mostly depends on the cementing technology for prism. Therefore, the cementing between each PBS and the dichroic prism must be strictly controlled. However, with the technical development of the LCoS panel, the dimension of pixels on the LCoS panel has been increasingly reduced. Consequently, the cementing between each PBS and the dichroic prism must be further strictly controlled to be within an acceptable tolerance. It is clear that, in the conventional designs as discussed above, since additional optical elements are further required to be cemented between the PBSs and the dichroic prism, the difficulty in the prism assembly is correspondingly increased, which is not desired and which increases the manufacturing cost.

In addition, the increase of system cementing interfaces between the PBSs, the dichroic prism and the additional optical elements will decrease the display contrast and hence adversely affect the image quality. This is because the light absorption of the prisms and the cementing material during work will result in temperature rise. Since the various components are different in temperature and in thermal expansion coefficient, deformation stress will occur at the cementing interfaces and the soft cementing materials will exhibit stress birefringence consequently. As a result, the display contrast of the output image will be adversely decreased after the image light beams reflected from the three LCoS panels pass the cementing materials.

As discussed above, in conventional liquid crystal projection systems with three LCoS panels, additional optical elements are generally required to be disposed between adjacent PBSs or between the PBS and the dichroic prism. This complicates the assembly process and decreases the image contrast. Hence, an improved three-panel liquid crystal projection system is desired to address the above problems that are encountered in the prior art.

SUMMARY OF THE INVENTION

Accordingly, an object of the present invention is to provide a liquid crystal projection system that has no additional optical elements cemented between a dichroic prism and PBSs thereof and that increases the image contrast consequently.

To achieve the above object, the present invention provides a liquid crystal projection system that includes a light source module, a light management module, an image signal module and a projection lens. The light source module outputs an illumination light beam of first polarization state. The light management module includes a color separator for separating the illumination light beam from the light source module into a first color light beam of first polarization state and a bichromatic light beam of first polarization state, first and second reflectors for respectively reflecting the first color light beam of first polarization state and the bichromatic light beam of first polarization state, a phase plate for transforming the bichromatic light beam of first polarization state into a bichromatic light beam of second polarization state, a first PBS for receiving the first color light beam of first polarization state, a second PBS cemented to the first PBS for receiving the bichromatic light beam of second polarization state, and a dichroic prism cemented to the second PBS for separating the bichromatic light beam of second polarization state into a second color light beam of second polarization state and a third color light beam of second polarization state. The image signal module includes a first image modulation unit disposed adjacent to the first PBS for transforming the polarization of the first color light beam from the first polarization state into the second polarization state, and second and third image modulation units disposed adjacent to the dichroic prism for respectively transforming the polarizations of the second and third color light beams from the second polarization state into the first polarization state. Each image modulation unit carries an image signal for a corresponding color light beam. The projection lens is disposed adjacent to the second PBS for projecting the color light beams that carry corresponding image signals and emit from the second PBS onto a screen.

According to the present invention, the first PBS and the dichroic prism are respectively cemented to two adjacent sides of the second PBS, and no additional optical elements have been disposed therebetween. Therefore, not only the number of optical elements to be cemented is decreased, but the contrast of the projected image is increased as well.

BRIEF DESCRIPTION OF THE DRAWINGS

The present invention may be best understood through the following description with reference to the accompanying drawings, in which.

DETAILED DESCRIPTION OF THE PREFERRED EMBODIMENTS

The above-mentioned technical content, features and advantages of the present invention will be clearly explained by the following detailed descriptions of eight embodiments of the present invention with reference to the drawings.

It should be noted that like elements are designated by the same reference numerals through the various views for simplicity.

Figure 1:
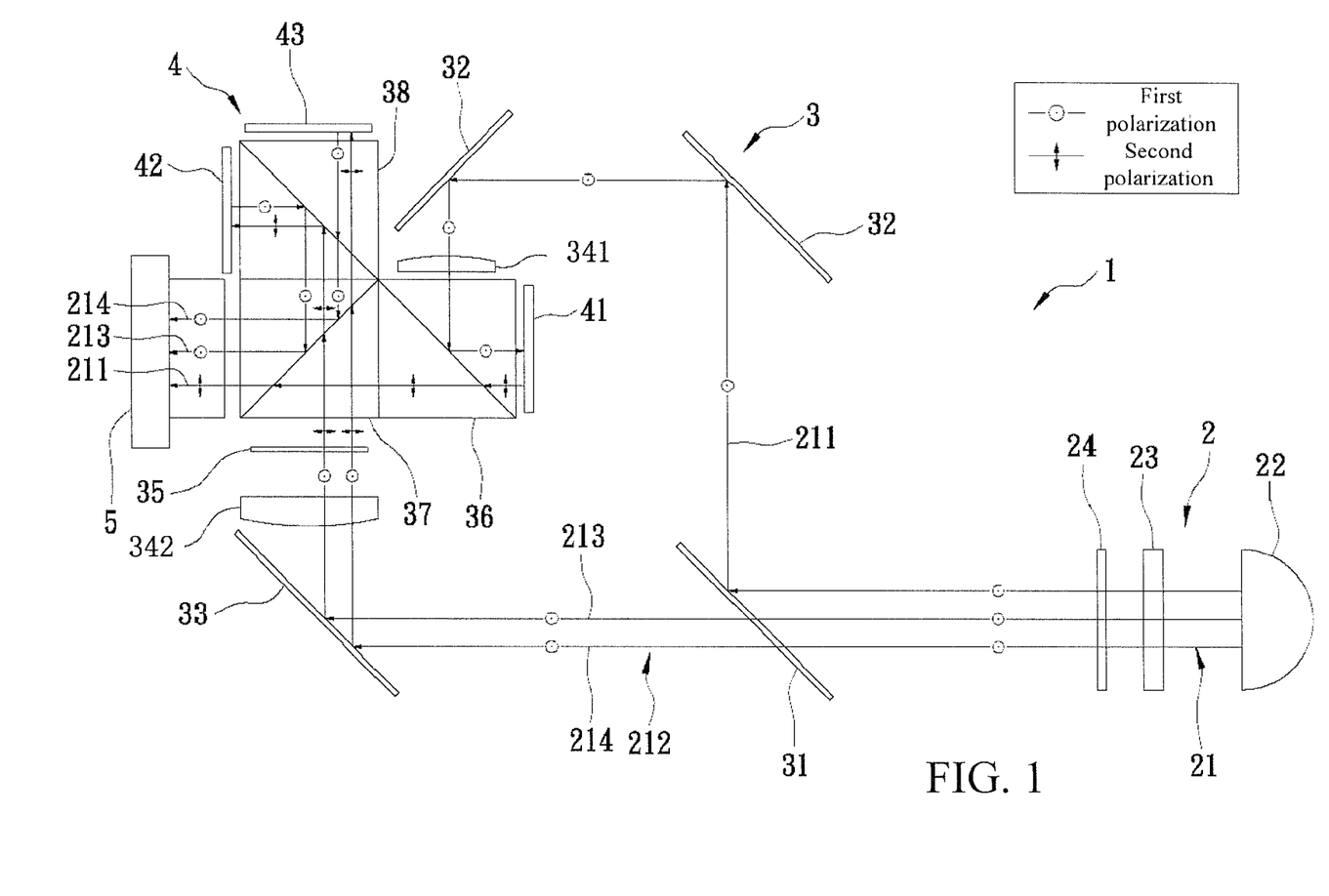
FIG. 1 is a schematic view illustrating the configuration of a liquid crystal projection system in accordance with a first embodiment of the present invention.

Referring to FIG. 1, a liquid crystal projection system 1 in accordance with a first embodiment of the present invention includes a light source module 2, a light management module 3, an image signal module 4 and a projection lens 5.

The light source module 2 includes a light source 22 for emitting a white illumination light beam 21 containing three primary colors and having two orthogonal polarizations, and an integrated lens array 23 and a polarization filter 24 that are sequentially arranged in a light output direction of the light source 22. The integrated lens array 23 homogenizes the energy distribution of the illumination light beam 21 from the light source 22 and also converts the beam shape from the original circular profile into a rectangular profile. The polarization filter 24 then transforms the dual-polarized illumination light beam 21 from the integrated lens array 23 into a single first polarization.

The light management module 3 includes a color separator 31, two first reflectors 32, a second reflector 33, first and second condensing lenses 341, 342, a phase plate 35, a first PBS (Polarization Beam Splitter) 36, a second PBS 37 and a dichroic prism 38. The color separator 31 separates the homogenized and polarized light beam 21 from the polarization filter 24 into a first color light beam 211 containing one primary color and a bichromatic light beam 212 containing the other two primary colors. The two first reflectors 32 sequentially reflect the first color light beam 211 from the color separator 31, and the second reflector 33 reflects the bichromatic light beam 212 from the color separator 31. The first and second condensing lenses 341, 342 respectively receive and condense the first color light beam 211 and the bichromatic light beam 212. The phase plate 35 transforms the first polarization of the bichromatic light beam 212 into a single second polarization. The first PBS 36 receives the first color light beam 211 of the first polarization from the first condensing lens 341. The second PBS 37, which abuts and is cemented to the first PBS 36, receives the bichromatic light beam 212 of second polarization state from the phase plate 35. The dichroic prism 38, which abuts and is cemented to the second PBS 37, separates the bichromatic light beam 212 from the second PBS 37 into a second color light beam 213 and a third color light beam 214 each of which contains one primary color. The first and second PBSs 36, 37 are cemented to each other and are arranged on an optical axis of the projection lens 5. The dichroic prism 38 and the phase plate 35 are respectively disposed on opposite sides of the second PBS 37 in a direction perpendicular to the optical axis of the projection lens 5. Each of the first PBS 36, the second PBS 37 and the dichroic prism 38 consists of two right-angle prisms.

The image signal module 4 modulates the first, second and third color light beams 211, 213 and 214 according to corresponding image signals (image information) provided by an external control circuit (not shown), to generate colored light beams containing image information for each of the color components. The image signal module 4 includes a first image modulation unit 41 disposed adjacent to the first PBS 36 for transforming the polarization of the first color light beam 211 from the first polarization into the second polarization, and second and third image modulation units 42, 43 disposed adjacent to the dichroic prism 38 for respectively transforming the polarizations of the second and third color light beams 213, 214 from the second polarization into the first polarization.

The projection lens 5 is disposed adjacent to the second PBS 37 for projecting the first, second and third color light beams 211, 213, 214 that carry corresponding image signals and emit from the second PBS 37 onto a screen.

In the first embodiment of the present invention, the illumination light beam 21 outputted from the light source module 2 is preferably a white light beam of S-polarization state. In addition, in the light management module 3, the color separator 31 is preferably in the form of a dichroic mirror that reflects a green light beam and transmits red and blue light beams. Accordingly, in the first embodiment, the first color light beam 211 is a green light beam, and the bichromatic light beam 212 is the combination of red and blue light beams (i.e., a purple light beam). The first and second reflectors 32, 33 are preferably in the form of reflecting mirrors for reflecting incident light beams. The phase plate 35 is preferably in the form of a half-wave plate ($\lambda/2$ wave plate, $\lambda=632.8$ nm) for transforming the polarization of the bichromatic light beam 212 from S-polarization into P-polarization (i.e., the second polarization). The first and second PBSs 36, 37 are preferably PBSs for transmitting the P-polarization color light beam and reflecting the S-polarization color light beam. The dichroic prism 38 preferably functions to reflect the blue light beam and transmit the red light beam. In the first embodiment, the second color light beam 213 is a blue light beam and the third color light beam 214 is a red light beam. Further, in the image signal module 4, the first image modulation unit 41 is preferably in the form of an LCoS panel for transforming the polarization of the first color light beam 211 from the first polarization into the second polarization and modulating the first color light beam 211 in conformity with a corresponding image signal to form an image light beam. Each of the second and third image modulation units 42, 43 is also preferably in the form of an LCoS panel for transforming the polarization of the second or third color light beam 213, 214 from the second polarization into the first polarization and modulating the second or third color light beam 213, 214 in conformity with a corresponding image signal to form an image light beam.

Provided below is a detailed description of the first embodiment, explaining how the S-polarization white light beam 21 provided by the light source module 2 is transmitted or reflected between the light management module 3 and the image signal module 4 before finally reaching the projection lens 5.

The S-polarization white light beam 21 outputted from the light source module 2 is first separated by the color separator 31 into a green light beam (the first color light beam) 211 and a bichromatic light beam 212 containing red and blue lights. The green light beam 211 is reflected by the color separator 31, then sequentially reflected by the two first reflectors 32 and finally condensed by the first condensing lens 341 to the first PBS 36. As the first PBS 36 only allows the P-polarization light beam to pass therethrough, the S-polarization green light beam 211 is reflected by the first PBS 36 to the first image modulation unit 41, which transforms the S-polarization green light beam 211 into a P-polarization green light beam 211 and modulates it into a green light beam carrying green image signal. The thus transformed and modulated green light beam 211 is reflected back to the first PBS 36 by the first image modulation unit 41, and sequentially passing the first and second PBSs 36, 37 before finally entering the projection lens 5.

The bichromatic light beam 212 containing red and blue lights is first transmitted by the color separator 31, and then reflected by the second reflector 33 and condensed by the second condensing lens 342 to enter the half-wave plate 35. The half-wave plate 35 converts the S-polarization bichromatic light beam 212 into a P-polarization bichromatic light beam 212 before it enters the second PBS 37. As the second PBS 37 allows the P-polarization light beam to pass therethrough, the P-polarization bichromatic light beam 212 is thus transmitted by the second PBS 37 to the dichroic prism 38. The dichroic prism 38 then separates the bichromatic light beam 212 into a blue light beam and a red light beam, in which the blue light beam is reflected as a second color light beam 213 to the second image modulation unit 42 and the red light beam is transmitted as a third color light beam 214 to the third image modulation unit 43. The second image modulation unit 42 transforms the P-polarization blue light beam 213 into an S-polarization blue light beam 213 and modulates it into a blue light beam carrying blue image signal. The thus transformed and modulated blue light beam 213 is reflected back to the dichroic prism 38 by the second image modulation unit 42, and is reflected back to the second PBS 37 by the dichroic prism 38. The blue light beam 213 finally enters the projection lens 5 by reflection of the second PBS 37. The third image modulation unit 43 transforms the P-polarization red light beam 214 into an S-polarization red light beam 214 and modulates it into a red light beam carrying red image signal. The thus transformed and modulated red light beam 214 is reflected back to the dichroic prism 38 by the third image modulation unit 43, and is sequentially transmitted by the dichroic prism 38 and reflected by the second PBS 37. The red light beam 214 finally enters the projection lens 5 by reflection of the second PBS 37.

As the light path length from the first image modulation unit 41 to the second PBS 37 for the green light beam 211 is equal to that from the second image modulation unit 42 to the second PBS 37 for the blue light beam 213 and also is equal to that from the third image modulation unit 43 to the second PBS 37 for the red light beam 214, the green light beam 211, the blue light beam 213 and the red light beam 214 carrying corresponding image signals are combined in the second PBS 37 before finally entering the projection lens 5. Thus, a true color image can be projected by the projection lens 5.

It should be noted that various modifications can be made to the present liquid crystal projection system 1 to meet other design requirements. For example, in the light path of the green light beam 211, only one first reflector 32 can be employed instead of two first reflectors 32 as shown. Similarly, in the light path of the bichromatic light beam 212, two second reflectors 33 can be employed instead of one second reflector 33 as shown. Further, the second reflector 33 and the condensing lens 34 can be arranged between the phase plate 35 and the second PBS 37.

Figure 2:
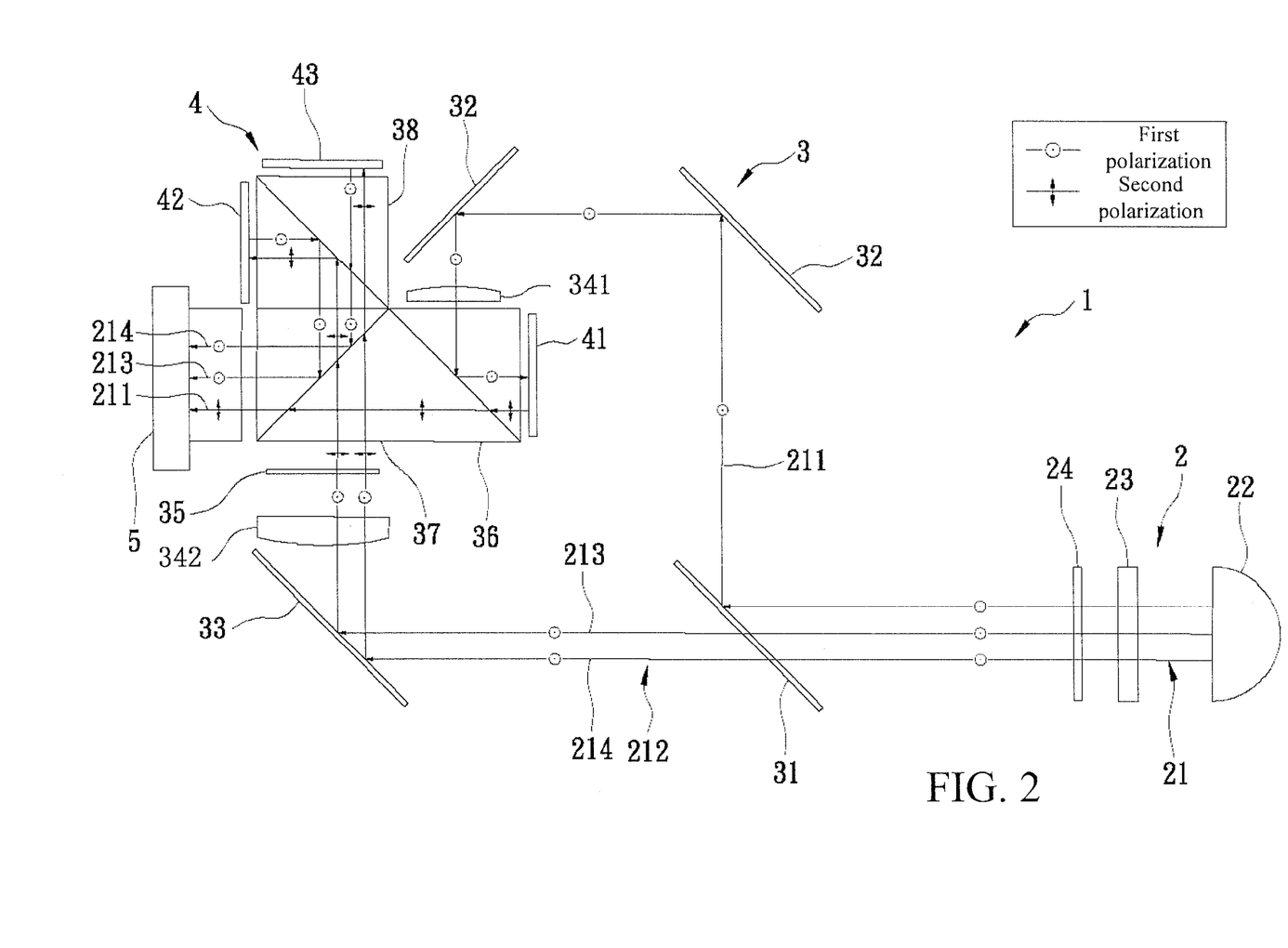
FIG. 2 is a schematic view illustrating the configuration of a liquid crystal projection system in accordance with a second embodiment of the present invention.

FIG. 2 is a schematic view illustrating the configuration of a liquid crystal projection system 1 in accordance with a second embodiment of the present invention. This embodiment is different from the first embodiment of FIG. 1 in that the first and second PBSs 36, 37 of the light management module 3 consist of three right-angle prisms, not four as in the first embodiment.

Figure 3:
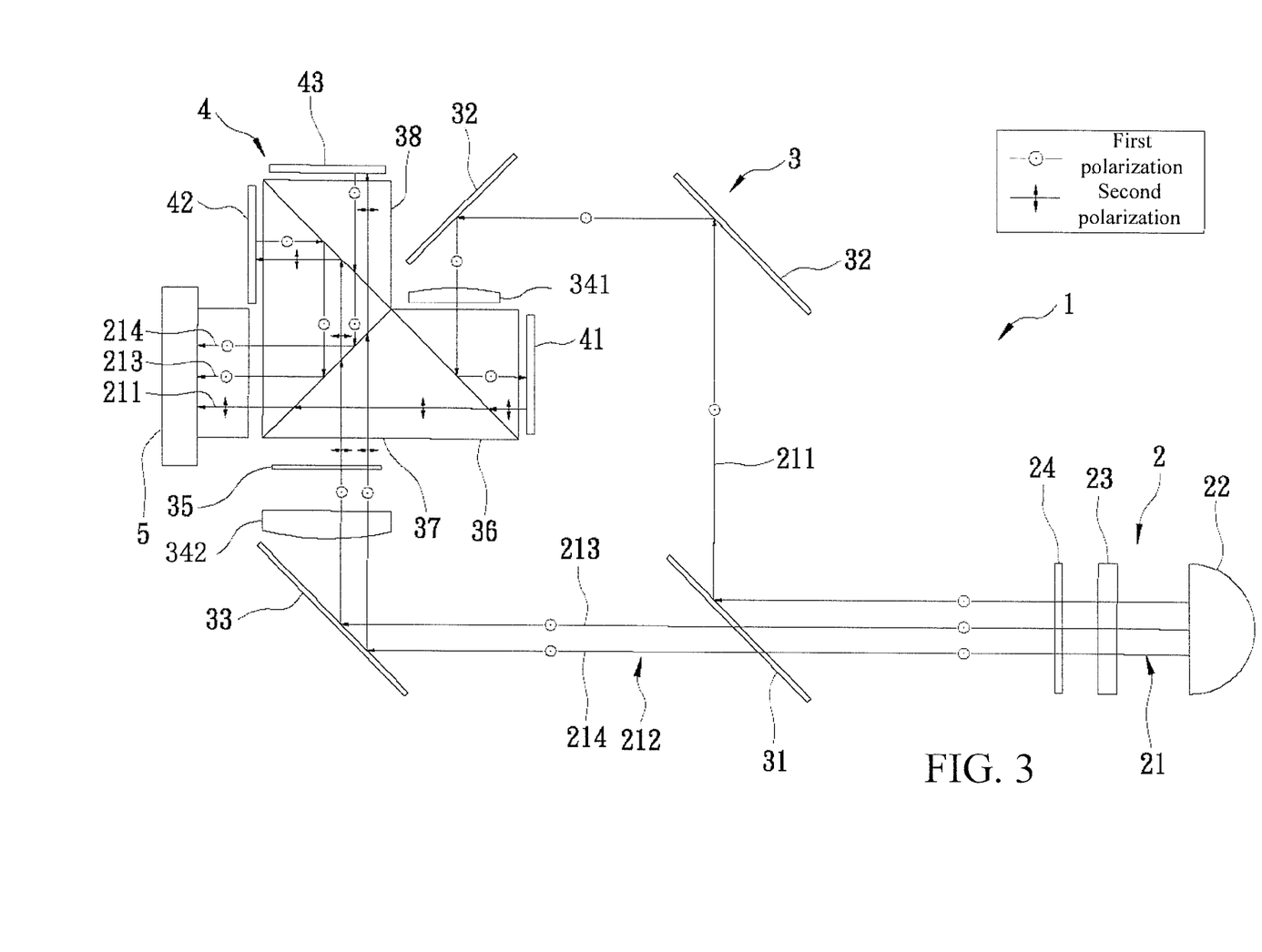
FIG. 3 is a schematic view illustrating the configuration of a liquid crystal projection system in accordance with a third embodiment of the present invention.

FIG. 3 is a schematic view illustrating the configuration of a liquid crystal projection system 1 in accordance with a third embodiment of the present invention. This embodiment is different from the first embodiment of FIG. 1 in that the dichroic prism 38 and the first and second PBSs 36, 37 of the light management module 3 only consist of four right-angle prisms, not six as in the first embodiment.

Figure 4:
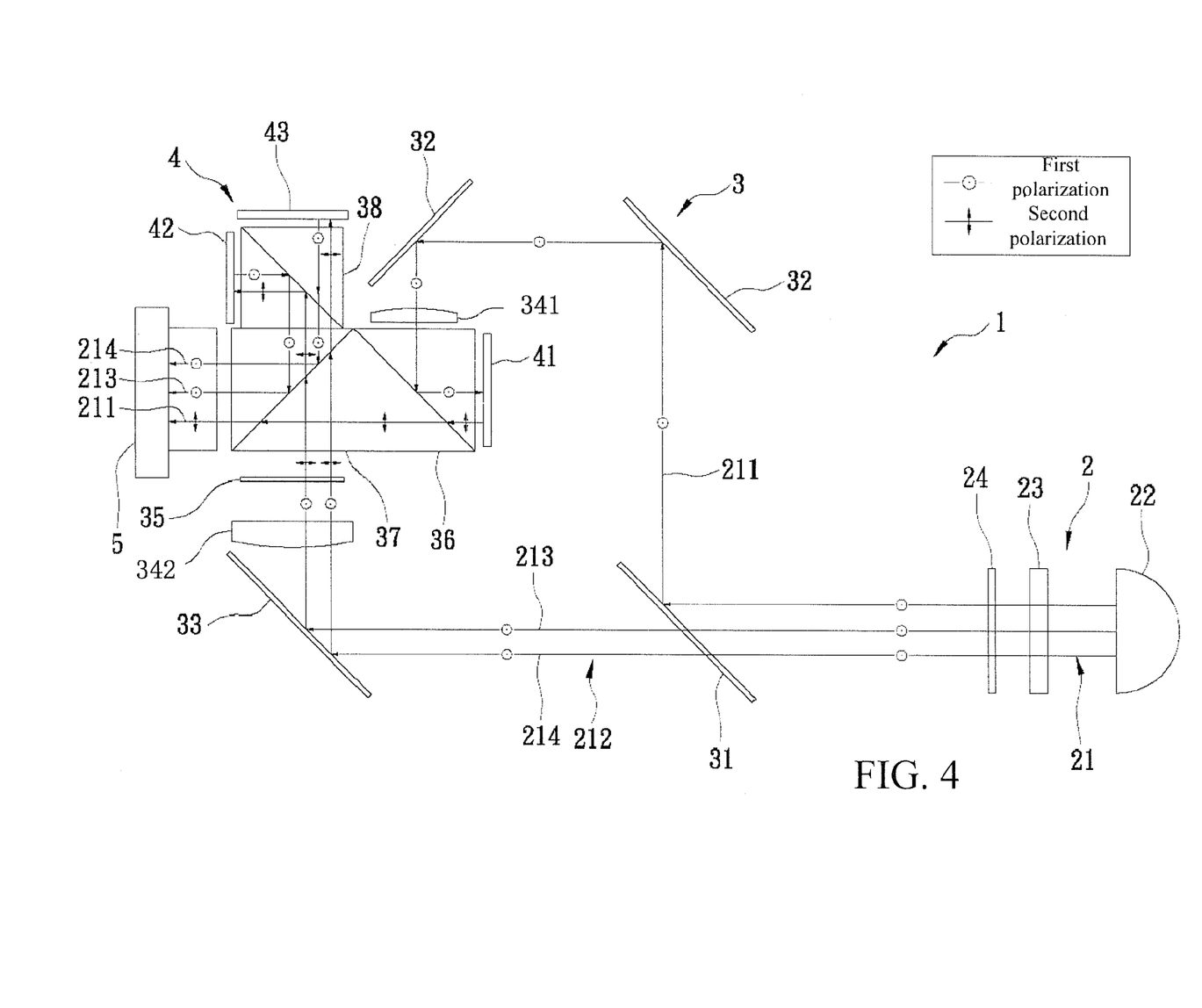
FIG. 4 is a schematic view illustrating the configuration of a liquid crystal projection system in accordance with a fourth embodiment of the present invention.

FIG. 4 is a schematic view illustrating the configuration of a liquid crystal projection system 1 in accordance with a fourth embodiment of the present invention. This embodiment is different from the first embodiment of FIG. 1 in that the first and second PBSs 36, 37 of the light management module 3 consist of three right-angle prisms, not four as in the first embodiment. In addition, the dichroic prism 38 of this embodiment is reduced in size so that the length of each side thereof is less than that of the second PBS 37. In other words, the dichroic prism 38 of this embodiment has a cross-sectional area smaller than that of the second PBS 37.

Figure 5:
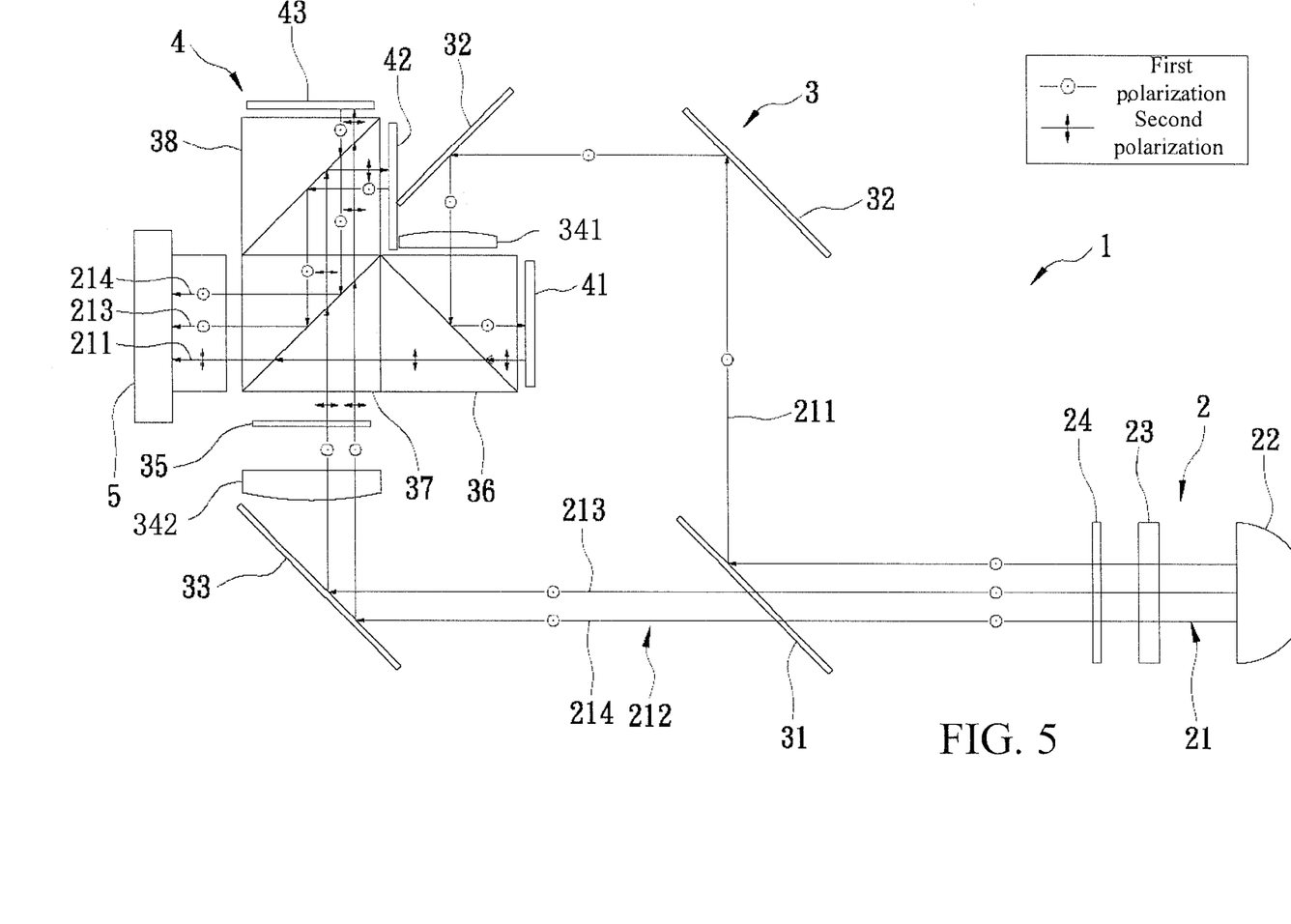
FIG. 5 is a schematic view illustrating the configuration of a liquid crystal projection system in accordance with a fifth embodiment of the present invention.

FIG. 5 is a schematic view illustrating the configuration of a liquid crystal projection system 1 in accordance with a fifth embodiment of the present invention. This embodiment is different from the first embodiment of FIG. 1 in that the second image modulation unit 42 is disposed on one side of the light management module 3 opposite to the projection lens 5, and is disposed on the same side of the light management module 3 as the first image modulation unit 41.

Figure 6:
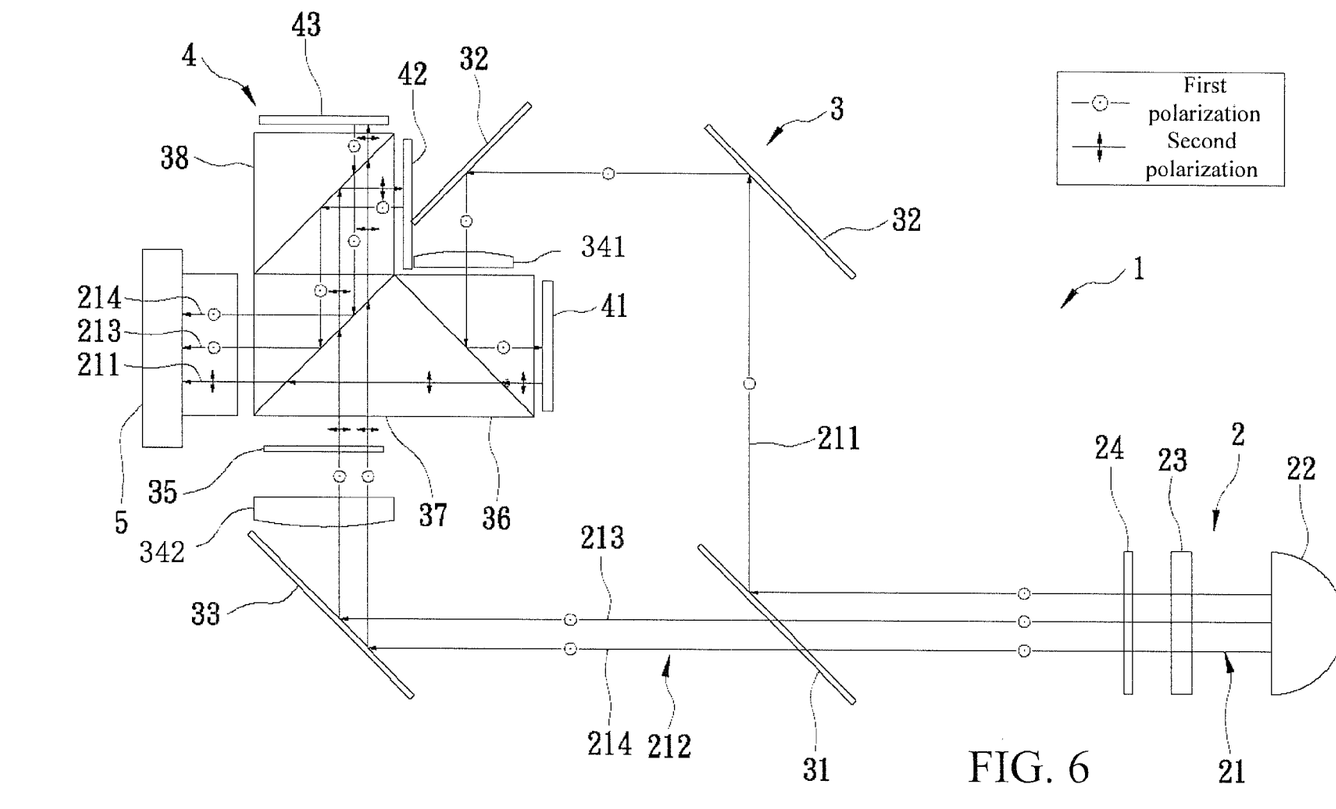
FIG. 6 is a schematic view illustrating the configuration of a liquid crystal projection system in accordance with a sixth embodiment of the present invention.

FIG. 6 is a schematic view illustrating the configuration of a liquid crystal projection system 1 in accordance with a sixth embodiment of the present invention. This embodiment is different from the fifth embodiment of FIG. 5 in that the first and second PBSs 36, 37 of the light management module 3 consist of three right-angle prisms, not four as in the fifth embodiment.

Figure 7:
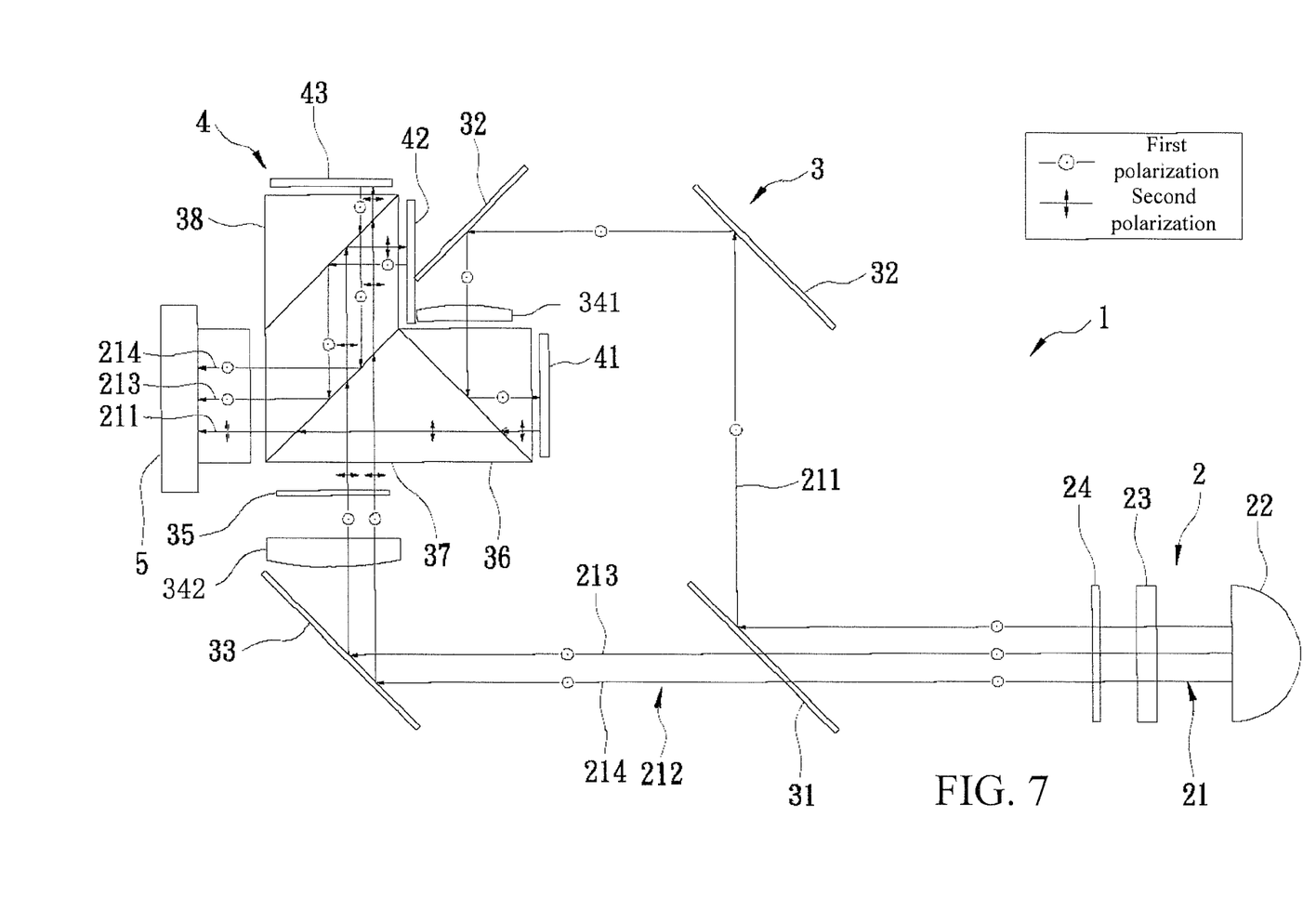
FIG. 7 is a schematic view illustrating the configuration of a liquid crystal projection system in accordance with a seventh embodiment of the present invention.

FIG. 7 is a schematic view illustrating the configuration of a liquid crystal projection system 1 in accordance with a seventh embodiment of the present invention. This embodiment is different from the fifth embodiment of FIG. 5 in that the dichroic prism 38 and the first and second PBSs 36, 37 of the light management module 3 consist of three right-angle prisms and one parallelogrammic prism, not six prisms as in the fifth embodiment.

Figure 8:
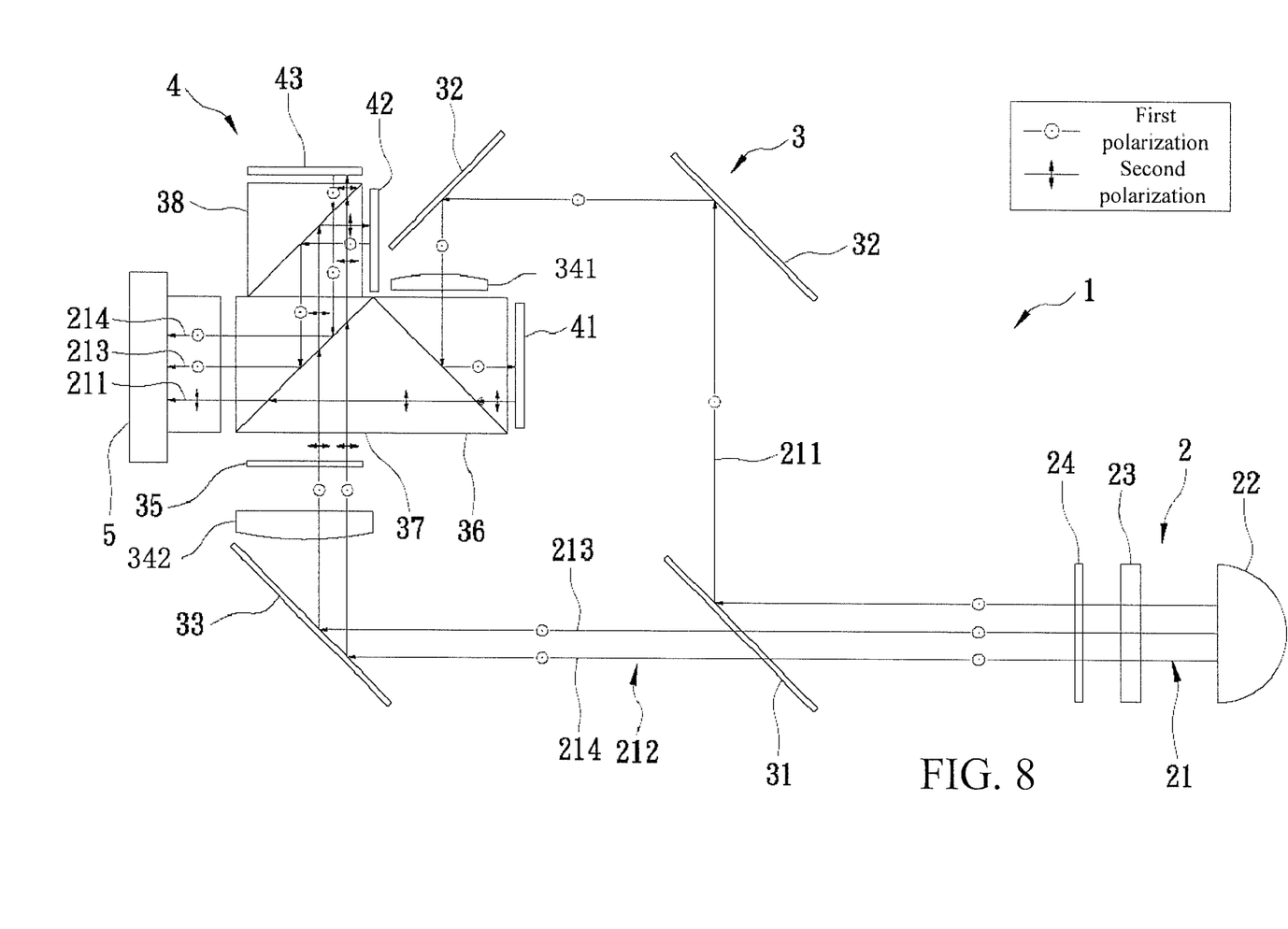
FIG. 8 is a schematic view illustrating the configuration of a liquid crystal projection system in accordance with an eighth embodiment of the present invention.

FIG. 8 is a schematic view illustrating the configuration of a liquid crystal projection system 1 in accordance with an eighth embodiment of the present invention. This embodiment is different from the fifth embodiment of FIG. 5 in that the first and second PBSs 36, 37 of the light management module 3 consist of three right-angle prisms, not four as in the fifth embodiment. In addition, the dichroic prism 38 of this embodiment is reduced in size so that the length of each side thereof is less than that of the second PBS 37. In other words, the dichroic prism 38 of this embodiment has a cross-sectional area smaller than that of the second PBS 37.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal projection system, comprising:
   a light source module providing an illumination light beam of first polarization state;
   a light management module including a color separator, first and second reflectors, a phase plate, a first polarization beam splitter, a second polarization beam splitter and a dichroic prism, the color separator separating the illumination light beam of first polarization state from the light source module into a first color light beam of first polarization state and a bichromatic light beam of first polarization state, the first and second reflectors respectively reflecting the first color light beam of first polarization state and the bichromatic light beam of first polarization state from the color separator, the phase plate converting the bichromatic light beam of first polarization state into a bichromatic light beam of second polarization state, the first polarization beam splitter receiving the first color light beam of first polarization state from the first reflector, the second polarization beam splitter directly cemented to the first polarization beam splitter and receiving the bichromatic light beam of second polarization state from the phase plate, the dichroic prism directly cemented to the second polarization beam splitter and separating the bichromatic light beam of second polarization state from the second polarization beam splitter into a second color light beam of second polarization state and a third color light beam of second polarization state;
   an image signal module including first, second and third image modulation units, the first image modulation unit disposed adjacent to the first polarization beam splitter and transforming and modulating the first color light beam of first polarization state from the first polarization beam splitter into a first color light beam of second polarization state carrying first image signal, the second image modulation unit disposed adjacent to the dichroic prism and transforming and modulating the second color light beam of second polarization state from the dichroic prism into a second color light beam of first polarization state, the third image modulation unit disposed adjacent to the dichroic prism and transforming and modulating the third color light beam of second polarization state from the dichroic prism into a third color light beam of first polarization state; and
   a projection lens disposed adjacent to the second polarization beam splitter and projecting the first, second and third color light beams carrying corresponding image signals from the second polarization beam splitter to a screen.

2. The liquid crystal projection system as claimed in claim 1, wherein the illumination light beam of first polarization state provided by the light source module is an S-polarization illumination light beam.

3. The liquid crystal projection system as claimed in claim 1, wherein the first and second polarization beam splitters are directly cemented to each other and are arranged on an optical axis of the projection lens, and the dichroic prism and the second polarization beam splitter are directly cemented to each other and are arranged in a direction perpendicular to the optical axis of the projection lens.

4. The liquid crystal projection system as claimed in claim 3, wherein one of the second and third image modulation units is disposed on the same side of the light management module as the projection lens.

5. The liquid crystal projection system as claimed in claim 4, wherein each of the first polarization beam splitter, the second polarization beam splitter and the dichroic prism consists of two right-angle prisms.

6. The liquid crystal projection system as claimed in claim 4, wherein the first and second polarization beam splitters consist of three right-angle prisms.

7. The liquid crystal projection system as claimed in claim 4, wherein the dichroic prism and the first and second polarization beam splitters consist of four right-angle prisms.

8. The liquid crystal projection system as claimed in claim 4, wherein the first and second polarization beam splitters consist of three right-angle prisms, and the dichroic prism has a cross-sectional area smaller than that of the second polarization beam splitter.

9. The liquid crystal projection system as claimed in claim 3, wherein each image modulation unit of the image signal module is disposed on a different side of the light management module from the projection lens.

10. The liquid crystal projection system as claimed in claim 9, wherein each of the first and second polarization beam splitters and the dichroic prism consists of two right-angle prisms.

11. The liquid crystal projection system as claimed in claim 9, wherein the first and second polarization beam splitters consist of three right-angle prisms.

12. The liquid crystal projection system as claimed in claim 9, wherein the first and second polarization beam splitters and the dichroic prism consist of three right-angle prisms and one parallelogrammic prism.

13. The liquid crystal projection system as claimed in claim 9, wherein the first and second polarization beam splitters consist of three right-angle prisms, and the dichroic prism has a cross-sectional area smaller than that of the second polarization beam splitter.

14. The liquid crystal projection system as claimed in claim 1, wherein the color separator is a dichroic mirror, and the first and second reflectors are reflecting mirrors.

15. The liquid crystal projection system as claimed in claim 1, wherein the phase plate is a half-wave plate disposed on one side of the second polarization beam splitter opposite to the dichroic prism.

16. The liquid crystal projection system as claimed in claim 1, wherein the light management module further comprises first and second condensing lenses for respectively condensing the first color light beam of first polarization state and the bichromatic light beam of first polarization state.

17. The liquid crystal projection system as claimed in claim 16, wherein the first condensing lens is disposed between the first reflector and the first polarization beam splitter.

18. The liquid crystal projection system as claimed in claim 16, wherein the second condensing lens is disposed between the second reflector and the second polarization beam splitter.

19. The liquid crystal projection system as claimed in claim 1, wherein the light source module comprises a light source for emitting a white illumination light beam, an integrated lens array and a polarization filter.

20. The liquid crystal projection system as claimed in claim 1, wherein the first, second and third color light beams are respectively green, blue and red light beams.

* * * * *